United States Patent Office 3,428,772
Patented Feb. 18, 1969

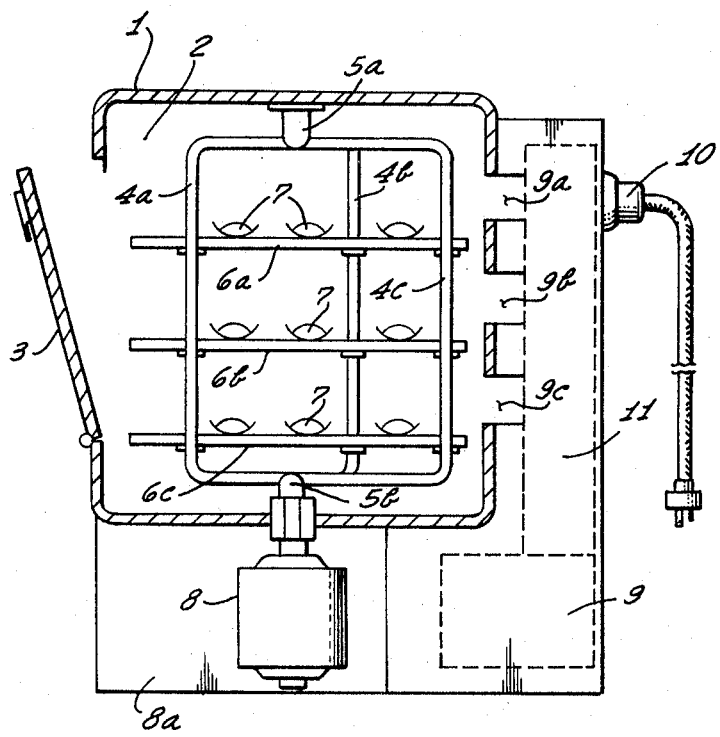

3,428,772
MICROWAVE OVEN WITH ROTATABLE SHELF
Karl Hans Wallenfels, Freiburg im Breisgau, Germany, assignor to Fritz Hellige & Co. G.m.b.H., Freiburg im Breisgau, Germany
Filed Dec. 2, 1966, Ser. No. 598,794
Claims priority, application Germany, Dec. 10, 1965, H 57,927
U.S. Cl. 219—10.55      7 Claims
Int. Cl. H05b 9/06

ABSTRACT OF THE DISCLOSURE

A microwave oven including apparatus for homogenizing the microwave field within the cavity of said microwave oven. Motorized shelf means rotatably mounted within said cavity comprise vertically spaced shelves for receiving food to be heated and shelf supporting means which include a plurality of vertical rods each of which extends a predetermined distance between the top and bottom of said cavity for supporting said shelf means, said rods additionally include horizontal top and bottom portions.

---

The present invention relates to microwave ovens, and more particularly, to an improved microwave oven which provides uniform heating with a rotatable shelf structure.

In microwave cooking or heating devices, standing waves of high frequency are set up within the oven cavity due, for example, to reflection of the waves from the cavity walls. Such standing waves include, locations of high electric field intensity and low electric field intensity at different locations within the oven cavity. Because the electric field provides the heating energy, this distribution of the field into standing waves results in relatively hot or cold spots at various locations within the oven cavity and, with a large piece of food or with several pieces placed about the cavity, causes some portions of food to be heated more than other portions. This result is obviously undesirable. Hence, many proposals for avoiding this problem and obtaining uniform heating have been suggested. As examples, the use of rotatable antennas, radiating elements for producing rotationally polarized electric fields, movable shutters for controlling the electric field distribution, adjustable devices for varying the coupling of the high frequency energy, externally positionable plates having different dielectric constants, distributed feed means for feeding the high frequency energy into the cavity at several locations and numerous different electric field polarizing devices have been heretofore suggested for obtaining uniform heating within the oven cavity. Moreover, another proposal suggests the utilization of a rotatable supporting shelf or tray within the cavity of the oven. By placing food on the supporting shelf and rotating the shelf through various zones of the standing wave pattern in the horizontal plane of the shelf all portions of the food are evenly heated because the time average exposure of each portion of the food to the various zones of different electric field intensities is substantially equal to any other on that shelf. Although this proposal appears to offer a simple solution, it possesses at least two disadvantages. Firstly, this simple supporting shelf or tray does not result in a sufficient utilization of the space within the oven cavity. Secondly, the conventional nonmetallic structure of such simple rotatable shelf or tray has little influence on the field distribution within the cavity, which remains unevenly distributed about the cavity.

Therefore, it is an object of this invention to provide both uniform heating of food within a microwave oven and full utilization of available oven space.

It is a further object of the invention to sequentially expose food to the electric field at different locations and levels within the oven cavity.

It is a further object of this invention to homogenize the distribution of the microwave field supplied to the oven cavity and to sequentially expose food to the microwave field therein at different levels and locations to ensure on a time average uniform heating throughout the entire oven cavity.

In accordance with the present invention, a shelf structure is rotatably mounted within the oven cavity of a microwave oven on a shaft and a motor is provided which is connected to the shaft for rotating the shelf structure. The shelf structure includes a plurality of vertically spaced shelves or trays supported in this manner by a shelf supporting means. The shelf supporting means included in the shelf structure may advantageously be a plurality of rods spaced from each other about the axis of rotation of the shaft and extending a predetermined length between the top and bottom walls of the cavity. Each of these rods, moreover, may advantageously contain a horizontal top and bottom portion, the respective top ends and bottom ends of which may be connected together and to respective upper and lower locations of the shaft. Either one or more of the respective shelves and rods consists of a conductive metal. Further, in accordance with the invention, either the individual shelves or the entire shelf structure or both may be detachably connected together.

The foregoing and other advantages and objects of the present invention will become apparent from a consideration of the following detailed description and the sole figure of the drawing which illustrates a preferred embodiment of the rotatable shelf structure constructed in accordance with the invention.

The figure shows a microwave oven unit, containing a cavity 2, bounded by the conductive walls of a metal housing 1 and a metal door 3, through which food is introduced into the cavity. A microwave energy source which may be a magnetron, is symbolically shown as 9. Energy from source 9 is coupled into cavity 2 through a waveguide 11 and the coupling waveguides 9a, 9b and 9c.

A shelf structure is mounted within the cavity 2 by means of a rotatable shaft means. This is shown as two individual shafts with a common axis of rotation: A driving shaft 5b, supported in the bottom cavity wall, and an idler shaft 5a, mounted in the upper cavity wall. This shelf structure includes a plurality of vertically spaced horizontal shelves 6a, 6b and 6c, which support the food 7 to be heated. The shelf structure further includes a shelf supporting means particularly shown as a plurality of rods 4a, 4b and 4c. Each rod contains a vertical portion to which the individual shelves are connected and includes a top horizontal portion and a bottom horizontal portion formed by bending of the ends of the rod. The vertical portions of the rods are spaced from each other about the axis of rotation of the shaft means, shafts 5a and 5b. The top horizontal portions of each of the rods are connected together and to the idler shaft 5a. In like manner, the bottom horizontal portions are connected together and to the driving shaft 5b. The individual shelves 6a, 6b and 6c are inserted between the vertical portions of the rods and each shelf is connected thereto at three different locations, one location on each rod, so as to maintain the individual shelves substantially horizontal. With this construction it is apparent that the full shelf or tray area can be utilized, which would not be the condition if instead a single shaft extending through each of the shelves were used. A motor 8, contained within a portion 8a of the oven unit, is coupled to the driving shaft 5b. A current connector for connecting the motor and microwave source to a current supply is symbolically shown as 10. Further, the waveguides 9a, 9b and 9c are vertically spaced and located in a vertical wall of the cavity, which in the preferred embodiment is the rear wall, and proximate a corresponding shelf. Moreover, in the preferred embodiment, each of the supporting rods 4a, 4b and 4c, and each of the trays or shelves 6a, 6b and 6c, are constructed of a metallic material which reflects microwave energy. However, should less homogenization of the microwave field within the cavity be desired, any number or all of the respective supporting rods and shelves may be constructed of a conventional nonmetallic material.

Further, in accordance with the invention, the connection of the rods to the shafts 5a and 5b may be either permanent or detachable. In like manner, the connection of the individual shelves to the supporting rods 4a, 4b and 4c may be either permanent or detachable. When such connections are made detachable, the entire shelf structure may be removed from the oven and disassembled or folded and stored away.

In use, the source 9 of the microwave energy is energized and provides microwave energy within the cavity 2. The motor 8 rotates shaft 5b coupled to the shelf structure and the latter within the cavity. In the illustrated embodiment, the food 7 on each tray is rotated to various positions on the plane of the tray within the cavity including a position proximate a respective waveguide such as 9a, 9b and 9c. Moving the food in such manner insures full utilization of the space within the oven and provides a degree of uniformity in heating. Moreover, with metallic material, which reflects microwave energy, comprising or forming a portion or portions of the shelf structure, such as the horizontal shelves and the vertical rods, the continuous rotation of the metallic shelf structure homogenizes the field distribution within the oven cavity by increasing the number of reflections of microwave energy and continually changing the type and direction of such reflections from the metallic shelf structure surfaces. The production of this continuous disturbance of the microwave field within the cavity prevents any single standing wave from being maintained. Because all portions of the oven have continually changing levels of field intensities, a single portion of food at any level will, over a period of time as it is rotated, be heated to the same degree as any other piece of food at any other level and location within the oven. Thus, the homogenization of the electric field within the cavity in accordance with the teaching of the invention results in the desired uniformity of heating.

The foregoing embodiments have been described for purposes of illustration only and are not intended to limit the invention within the spirit and scope of the appended claims.

What is claimed is:

1. A microwave oven comprising a source of microwave energy; a cavity bounded by conductive walls; coupling means for coupling microwave energy from said source into said cavity; a shelf means contained within said cavity for receiving food to be heated and for homogenizing the microwave field within said cavity, said shelf means comprising a plurality of vertically spaced shelves and shelf supporting means connected to said shelves for supporting said plurality of shelves in vertically spaced positions, said shelf supporting means comprising a plurality of vertical rods each of which extends a predetermined distance between the top and bottom of said cavity, said rods additionally include horizontal top and bottom portions; shaft means connected with said cavity and to said shelf supporting means at said respective top and bottom portions of said respective rods for rotatably mounting said shelf supporting means within said cavity; and motor means coupled to said shaft means for rotating said shelf means whereby food received within said shelf means is uniformly heated.

2. The invention as defined in claim 1, wherein said rods comprise metallic material for homogenizing the microwave field within said cavity.

3. The invention as defined in claim 2, wherein said shelves comprise metallic material.

4. The invention as defined in claim 1, wherein said coupling means includes means for coupling microwave energy into said cavity at a plurality of vertically spaced locations in a vertical wall of said cavity, said plurality being equal in number to the said plurality of shelves.

5. The invention as defined in claim 1, wherein said coupling means includes means for coupling microwave energy into said cavity at a plurality of vertically spaced locations in a vertical wall of said cavity, said plurality being equal in number to the said plurality of shelves and one of each of said plurality located proximate a corresponding one of said plurality of shelves.

6. The invention as defined in claim 1, wherein said shaft means comprises an idler shaft mounted to an upper wall of said cavity, and a driving shaft mounted to a lower wall of said cavity, said idler shaft and said driving shaft having a common axis of rotation.

7. The invention as defined in claim 3, wherein said shaft means comprises an idler shaft mounted to an upper wall of said cavity, and a driving shaft mounted to a lower wall of said cavity, said idler shaft and said driving shaft having a common axis of rotation.

References Cited

UNITED STATES PATENTS

| 2,912,554 | 11/1959 | Snyder | 219—10.55 |
| 3,056,877 | 10/1962 | Schmidt et al. | 219—10.55 X |
| 3,210,511 | 10/1965 | Smith | 219—10.55 |
| 3,373,259 | 3/1968 | Smith | 219—10.55 |

RICHARD M. WOOD, *Primary Examiner.*

L. H. BENDER, *Assistant Examiner.*